Figure 1:

Aug. 30, 1966     A. KURTZ     3,270,103
PRODUCTION OF SHOCKPROOF EXPANDED PLASTIC SHEETS
Filed March 27, 1963     4 Sheets-Sheet 1

INVENTOR:
ADOLF KURTZ
BY
ATT'YS

INVENTOR:
ADOLF KURTZ

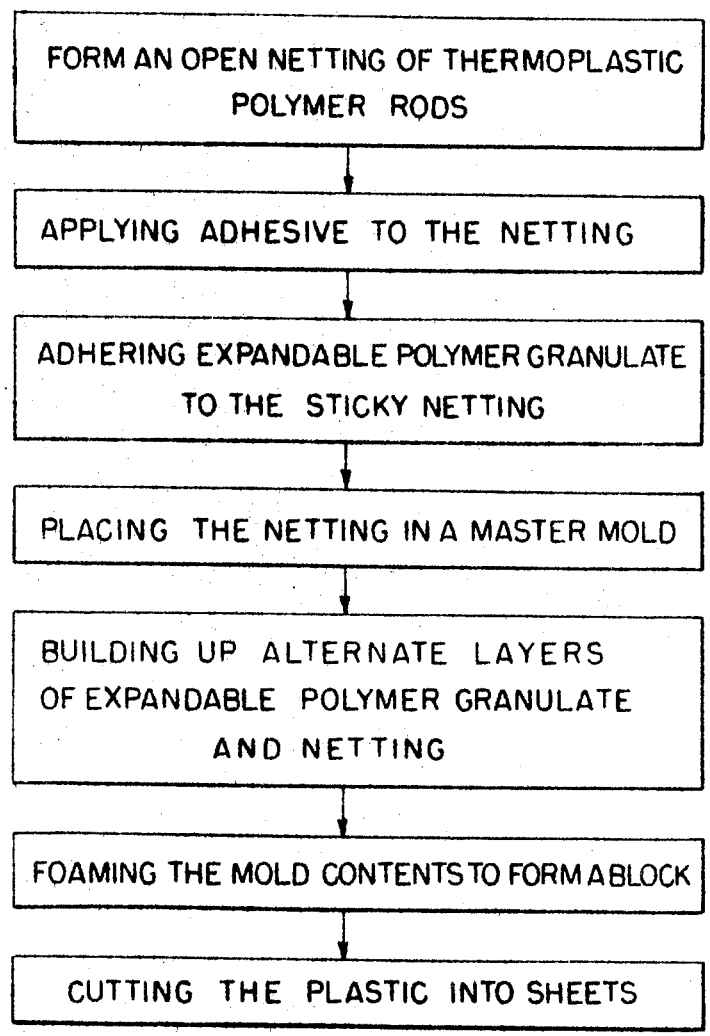

United States Patent Office 3,270,103
Patented August 30, 1966

3,270,103
PRODUCTION OF SHOCKPROOF EXPANDED
PLASTIC SHEETS
Adolf Kurtz, Fussgonheim, Germany, assignor to Badische Anilin- & Soda-Fabrik Aktiengesellschaft, Ludwigshafen (Rhine), Germany
Filed Mar. 27, 1963, Ser. No. 268,364
Claims priority, application Germany, Mar. 31, 1962,
B 66,627
6 Claims. (Cl. 264—45)

The present invention relates to a process for the production of sheets of expanded plastic and more particularly to a process for the production of shockproof sheets of expanded plastic which are resistant to pressure and tensile stress.

It is known to reinforce sheets of expanded plastic by means of layers of plywood, plastic sheets or expanded metal or also with cement plaster on the outer faces, and thereby to make them resistant to bending and compression as so-called sandwich panels.

It is a disadvantage of these prior art constructions that as compared with sheets which have not been reinforced they are heavier, have poorer insulating properties in relation to the total thickness, require subsequent working in the case of sheets cut from a block or produced individually, and in the case of expanded metal reinforcement have a lower resistance to weathering and a greater susceptibility to corrosion.

On the other hand it is also known to reinforce concrete with steel mesh to make it resistant to tensile and shear forces.

The object of the present invention is to provide a process for the production of shockproof expanded plastic sheets which are resistant to compression, tension and shrinkage, or walls or partitions consisting of individual expanded plastic sheets or sheeting which do not exhibit the disadvantages attaching to the prior art sheets. The sheets prepared according to this invention may if desired be used for making walls, partitions or ceilings provided with panels and for insulating layers for walls, floors and ceilings.

I have found that shockproof expanded plastic sheets or sheeting resistant to compression, tension and shrinkage, for walls, ceilings, panelled walls or insulating layers for walls, floors and ceilings can be produced by preparing reinforcing netting of plastic fibers, plastic wire or other shaped articles of plastic, said netting being dimensioned according to the size of the sheets, providing this netting with an adhesive, uniting the reinforcing netting which thus has been made sticky with expandable plastic granulate in a perform, laying the netting in a master mold partly filled with plastic granulate and adding a layer of plastic granulate, heating the filled master mold as a whole and thereby expanding its contents to form an expanded plastic sheet and removing the finished expanded sheet from the master mold after the latter has cooled.

To prepare simultaneously a plurality of sheets of equal size, a number of reinforcing nettings or reinforcing frames having a size corresponding to the size of the sheet required and made of plastic fibers, plastic wire or other plastic shaped articles are prepared, provided with an adhesive, for example glue, the nettings or frames thus made sticky each combined and filled with plastic granulate in a preform, the nettings or frames surrounded with plastic granulate introduced consecutively into a master mold provided at the bottom with a layer of granulate, and intermediate layers of granulate interposed between the individual nettings or frames, the master mold then heated as a whole and its contents expanded into a block containing a plurality of potential sheets each containing a netting or frame, the block allowed to cool, removed from the master mold and parted between the individual nettings or frames into a plurality of sheets which may then be assembled to form walls, coverings or insulating layers.

The essential feature of the inventive concept accordingly consists in reinforcing the plastic sheets with plastic fibers or similar plastic shaped articles, a close union of the embedded reinforcement with the surrounding expanded plastic being achieved. Owing to the high strength of the reinforcing means and its low weight, the weight of the sheet is not appreciably increased but a very effective increase in strength is achieved.

For the continuous production of elongated sheeting of shockproof expanded plastic, endless reinforcing webs in the form of netting and of the same width as the sheets are prepared from plastic fibers, plastic wire or other plastic shaped articles, provided with adhesive and united with plastic granulate, the reinforcing web introduced continuously together with the remainder of the plastic granulate into a mold space formed by two moving surfaces open at two opposite ends, said reinforcing web surrounded by granulate heated in the interior of the mold space and expanded to an endless expanded plastic sheeting, the finished expanded plastic sheeting removed from the mold space and wound up or cut into sheets of any desired length.

The reinforcing frame may advantageously be prepared by making a flat cross-grating of plastic wire, sticking it with glue at the points of intersection, bending it over a form to angular corrugations having flattened outer surfaces and uniting the resultant inner member of the reinforcing frame with flat cross-gratings on each of the two outer surfaces.

A further increase in strength can be achieved by filling the master mold toward the outer surfaces with slightly preexpanded granulate and the intermediate layers in the interior of the mold with strongly preexpanded granulate. In this way hard, abrasion-resistant surfaces are formed.

A further increase in strength while preserving the low weight may be achieved by embedding in the sheets a reinforcing netting or frame of uneven mesh, the mesh becoming narrower at the edges of the individual sheets and becoming wider toward the middle of the sheets.

The finished sheets may be joined together at their abutting edges, in a manner resistant to tension, to form walls and ceilings by means of pointed connection members pressed simultaneously into two sheets, on one side or on both sides.

It is possible by the process according to this invention to prepare long reinforced webs of expanded plastic which can readily be rolled up and bent. For this purpose the reinforcing netting or frame of plastic fibers may be rolled up spirally with regular gaps and inserted into a cylindrical mold, provided with adhesive, embedded in granulate, the filled block mold heated and expanded to form a block and the block then allowed to cool, removed from the mold and cut spirally to a coherent web containing a single layer of the reinforcing netting or frame.

Figure 2:
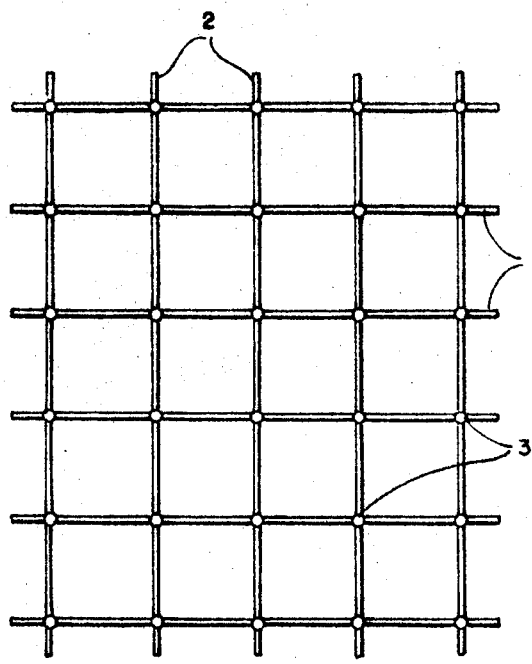
Figure 3:
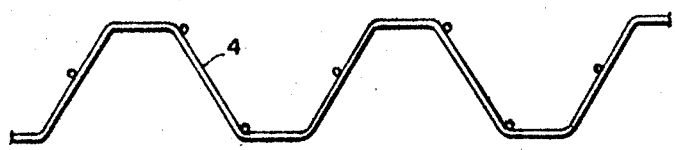
Figure 4:
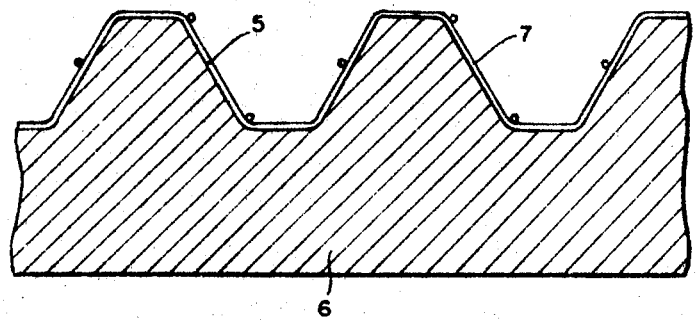
Figure 5:
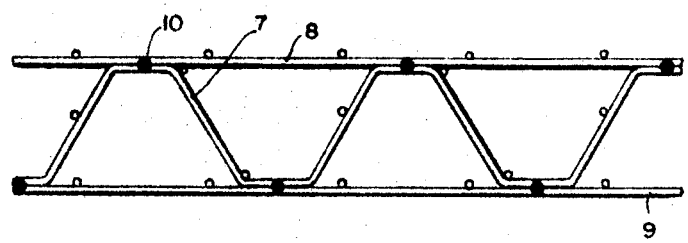
Figure 6:
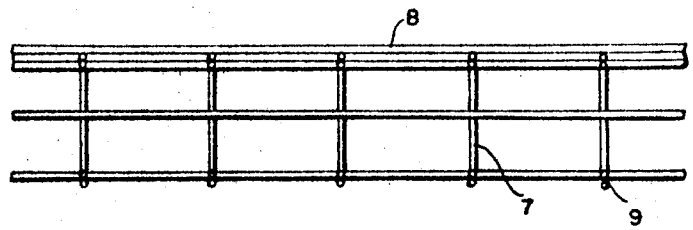
Figure 7:
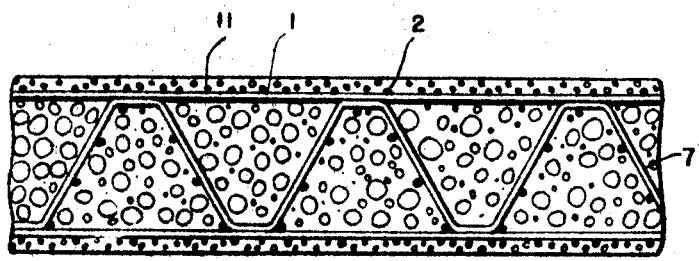
Figure 8:
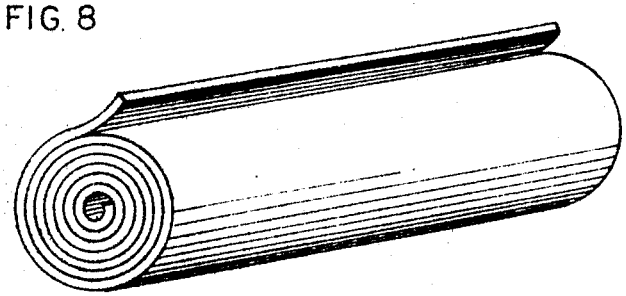

The invention will now be further described with reference to the accompanying drawings in which FIGURES 1 and 2 are an end elevation and plan of a flat cross-grating, FIGURE 3 is an end elevation of an angular corrugated cross-grating, FIGURE 4 is a section of a form for bending into shape the angular corrugated cross-grating of FIGURE 3, FIGURE 5 is an end elevation of one embodiment of a complete reinforcing frame comprising an inner member and two flat cross-gratings secured to the outside thereof, FIGURE 6 is an elevation perpendicular to FIGURE 5, FIGURE 7 is a sectional elevation of a finished reinforced expanded plastic sheet having abrasion resistant surfaces, FIGURE 8 is a perspective view of a reinforced plastic web which has been prepared in spiral form and cut, and FIG. 9 is a block diagram of the process.

Flat cross-gratings necessary for reinforcement of sheets are prepared from plastic wire (FIGURES 1 and 2). For example drawn and prestressed polyamide wires having a thickness of 0.5 mm. may be used. Preparation of the cross-grating is facilitated if the wires 1 are stretched parallel to each other over a frame having notches cut in the edges. The spacing of the notches is equivalent to the width of mesh of the grating. Wires 2 are stretched at right angles to the wires 1 on the top of the wires 1 and in the same mesh width. Wires 1 and 2 are not interwoven with each other. A suitable adhesive liquid, for example glue, is sprayed by means of a spraygun onto the flat cross-grating consisting of the wires loosely laid on one another. The wires are thus united together at the intersections 3 (FIGURE 2).

To make the inner member of the reinforcing frame as shown in FIGURE 3, a flat cross-grating prepared as described above is laid on a form 6 (FIGURE 4) having grooves 5 of trapeziform cross section which correspond with the angular corrugations 4 of the inner member. By means of an appropriately shaped counter form (not shown in FIGURE 4), for example a cylinder having corresponding grooves, the flat cross-grating is bent into the inner member 7 of the reinforcing frame (FIGURE 5).

Cross-gratings similar to that shown in FIGURES 1 and 2 are then laid on the outer surfaces of the inner member, as shown at 8 and 9, and sprayed with glue. Union of the intersections 10 of the inner member with the flat cross-gratings again takes place by the glue and a stiff wire frame is formed. FIGURE 6 is a view of the frame at right angles to that in FIGURE 5.

This frame is united in a preform with plastic granulate and then laid in a master mold provided at the bottom with preexpanded plastic granulate. Then intermediate layers of granulate are introduced to fill the interstices in the frame. A further layer of granulate is placed on the frame thus filled and a frame laid on this in the same way. Any desired number of frames and intermediate layers of granulate are introduced into the master mold and the whole expanded by heat. The frames are thus closely enveloped on all sides by expanded plastic and the individual particles of plastic weld together.

The block reinforced with frames thus obtained may be cut in the usual way by means of an electrically heated wire or a band saw into sheets. These sheets, in spite of the reinforcement, have the high insulating value of the non-reinforced sheets of expanded plastic. On the other hand they are not heavier than these and have a much higher resistance to shearing, tension and bending than the plastic sheets which are not reinforced. The strength properties of the sheets according to this invention may be varied within a wide range, according to the requirements placed upon them, by the choice of wire diameter, mesh width of the grating and also by regulating the hardness of the expanded plastic.

The outer portions of the sheets, which for static reasons are known to take the bulk of the stress when the sheets are subjected to bending strain, may be made particularly abrasion resistant and hard. For this purpose the master mold is filled toward the outer surface of the sheets to be prepared with only slightly preexpanded fine-grained granulate. The internal space of the frame is however filled with coarse-grained strongly preexpanded plastic granulate. After expansion, compacted and harder surfaces 11 are formed (FIGURE 7). These pressure resistant outer layers give in conjunction with the tension resistant grating a very strong sheet resistant to bending.

If it is desired to prepare a plurality of such sheets at the same time in one master mold, the intermediate layers between each two frames are also composed of strongly expanded granulate. After expansion, the block is parted into single sheets in the way described above. Parting is effected for example by cutting the block in each case in the middle of a hard layer.

To make elongated reinforced sheeting, appropriately long frames or cross-gratings are rolled up spirally and inserted into a cylindrical mold. After filling the mold with plastic granulate, the shape is fully expanded. The cylindrical block is allowed to cool and cut spirally to form a coherent web containing a single layer of the reinforcing frame or netting (FIGURE 8).

When expanding simple parts, for example flower boxes or vases, the strength can be considerably increased by merely embedding a flat grating (as shown in FIGURES 1 and 2). If the expanded plastic is made soft, the finished sheeting or sheet, provided the dimensions are suitable, may be wrapped around a tube or edged profile without breaking.

Plastic sheets which have been reinforced in accordance with this invention may be used widely in the building trade for completing exterior and interior surfaces. It is possible in this way to make panels for walls without additional labor. In the case of ceiling boards, the supporting lath lattice may be considerably more widely spaced or may be replaced by reinforced framing. In the lining of rafters in lofts, a span of 65 cm. from rafter to rafter can be achieved without having to use additional means to prevent rupture, by impact.

The process according to this invention also offers particular advantages in the light construction of furniture. Light furniture for transportation vehicles, such as ships, may be prepared thus. A coating of hard lacquer or a veneer of plastic is sufficient to consolidate the outer skin of the member, while the total strength can be kept sufficiently high by the internal reinforcement.

The process may also be used with advantage for the production of parts for refrigerators and refrigerating chests. By the production of readily flexible webs it is possible to use the sheets as decorative sheets and for packaging goods. A further advantage in the building trade is obtained by reason of the reinforcement with plastic wire. Long insulating webs may be transported as a roll and installed more simply and cheaply than prior art sheets. This form of construction also offers advantages for insulating circular containers.

The following tests ilustrate the behavior of sheets prepared according to this invention under load as compared with sheets without reinforcement.

*Load tests*

Bending tests carried out on rectangular sheets having the dimensions 20 x 20 x 3 cm. and having been provided with a reinforcement of plastic wire 0.5 mm. in thickness, and on sheets of the same size without any reinforcement gave the following results:

The reinforced sheet was supported at a width of 15 cm. and a maximum load of 60 kg. (i.e. 7.8 kg./sq. cm.) was achieved with a deflection of 2.4 cm. Small cracks appeared on the underside of the sheet, but these extended only to the reinforcing grating. The sheet did not break.

The sheet without reinforcement fractured under a maximum load of 47 kg. (i.e. a surface load of 5.8 kg./sq. cm.), the deflection being 1.2 cm.

By making the reinforced plastic sheet harder, it is capable of withstanding even higher loads. This was clearly shown by a piercing test in which the sheet was laid on a circular support having a diameter of 8.5 cm. and pierced by a spike having a diameter of 2 cm. A force of 109 kg. was required to pierce the reinforced sheet, whereas the sheet without reinforcement was pierced with a load of only 21 kg.

I claim:
1. A process for the production of shockproof plastic expanded sheets useful as sheeting for walls, ceilings, panelled walls or insulating layers for walls, floors and ceilings which are resistant to pressure, tension and shrinkage which comprises preparing a reinforcing, open netting of thermoplastic polymer rods dimensioned to correspond to the size of the sheet, providing said netting with adhesive, uniting the resultant sticky netting with expandable plastic granulate, placing the resultant product in a master mold partly filled with expandable plastic granulate, adding a further layer of expandable plastic granulate, heating said filled master mold and thus expanding its contents into an expanded plastic sheet, allowing said master mold to cool and removing the expanded sheet therefrom.

2. A process for the production of shockproof expanded plastic sheets as claimed in claim 1 which comprises making simultaneously a plurality of sheets of the same size by preparing a plurality of said reinforcing netting, providing each of the said reinforcing nets with adhesive, uniting each sticky reinforcing net thus obtained in a preform with expandable plastic granulate, providing a layer of expandable granulate at the bottom of a master mold, consecutively introducing the nets with united granulate into said master mold with intermediate layers of expandable granulate therebetween, heating the entire master mold so that its contents expand to form a block containing a plurality of sheets, allowing the master mold to cool and removing said block which is then severed parallel with said netting into sheets.

3. A process for the production of shockproof plastic sheeting which comprises preparing a continuous reinforcement web of an open netting of thermoplastic polymer rods, providing the net web with adhesive, uniting the sticky net web with an expandable plastic granulate, passing the net web together with the additional expandable plastic granulate continuously into a mold space formed by two moving surfaces open at two opposite ends, heating the reinforcing net surrounded by expandable granulate in the interior of the mold space to expand it to an endless expanded plastic sheeting, and removing the finished expanded plastic sheeting from the mold space.

4. A process as claimed in claim 1 wherein the reinforcing netting is made by preparing a flat cross-grating of thermoplastic polymer rods, sticking the crossed rods at the intersections with glue, bending it over a form to an angular corrugated shape to form an inner member and joining two flat cross-gratings of thermoplastic polymer rods to the outer faces of the inner member.

5. A process as claimed in claim 1 wherein the reinforcing netting embedded is of uneven mesh, the mesh becoming narrower at the edges of the individual sheets and becoming wider toward the middle of the sheets.

6. A process which comprises rolling up a reinforcing netting of thermoplastic polymer rods to produce a spiral with regular gaps, providing the spiral with adhesive, uniting the sticky spiral with expandable plastic granulate, introducing the granulate-covered spiral into a cylindrical block mold, filling the void space in the mold with expandable plastic granulate, heating the filled block mold to cause expansion to form a block, allowing the mold to cool, removing said block and cutting said block spirally into a coherent web containing a single continuous layer of reinforcing netting.

References Cited by the Examiner

UNITED STATES PATENTS

| | | | |
|---|---|---|---|
| 2,954,589 | 10/1960 | Brown | 264—46 |
| 2,962,407 | 11/1960 | Aykanian | 264—47 |
| 3,037,897 | 6/1962 | Pelley | 264—47 XR |
| 3,043,627 | 7/1962 | Torjusen | 264—46 XR |
| 3,081,488 | 3/1963 | Casavina et al. | 264—45 XR |
| 3,091,998 | 6/1963 | Wehr et al. | 246—45 |
| 3,124,626 | 3/1964 | Graham et al. | 264—45 |
| 3,157,144 | 11/1964 | De Jarnett | 264—45 XR |

FOREIGN PATENTS 841,647  7/1960  Great Britain.

ALEXANDER H. BRODMERKEL, *Primary Examiner.*

P. E. ANDERSON, *Assistant Examiners.*